Figure 1:
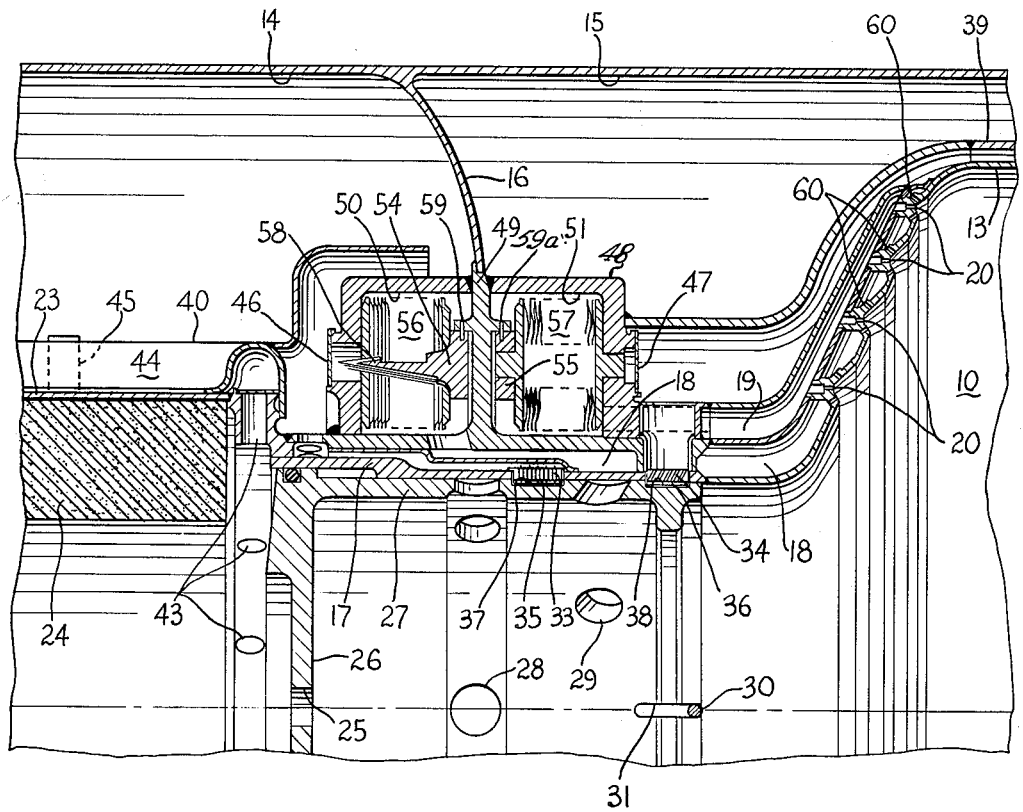

Oct. 6, 1964    R. F. WHITE ETAL    3,151,448
ROCKET ENGINE
Filed June 21, 1962

INVENTORS
ROGER F. WHITE
JAMES F. DAVIES
BY BENJAMIN SCHULKIN

AGENT

United States Patent Office 3,151,448
Patented Oct. 6, 1964

3,151,448
ROCKET ENGINE
Roger F. White, Rutherford, James F. Davies, Sparta, and Benjamin Schulkin, West Caldwell, N.J., assignors to Thiokol Chemical Corporation, Bristol, Pa., a corporation of Delaware
Filed June 21, 1962, Ser. No. 204,151
8 Claims. (Cl. 60—35.6)

This invention relates generally to rocket engines and more particularly to an ignition system for large liquid propellant rocket engines.

In either single stage rocket engine operation, or initial or "boost" stage of a two-stage engine, when liquid propellants are employed, maximum propellant flow is effected upon the activation or ignition of the rocket engine. Occasionally, the propellants fail to ignite as programmed and a highly dangerous situation is thereby created in that hazardous quantities of unignited propellants immediately accumulate with the attendant problems.

Various means have been proposed for safely preventing or remedying this highly dangerous situation which could cause explosion and blowing apart of the rocket and while some have been satisfactory in operation, most involve overly complex, impractical or inordinately expensive modifications of the rocket engine or of attachments therefor.

Accordingly, the main object of the present invention is to provide an improved rocket engine ignition system which will obviate the disadvantages of known solutions to this dangerous problem by eliminating the occurrence of the problem.

An important object of the present invention is to provide an improved ignition system for large liquid propellant rocket engines which utilizes a three-stage system which is fail safe.

Another important object of the present invention is to provide a three stage fail safe ignition system for large rocket engines wherein the liquid propellants cannot be injected into the engine during a given stage without combustion and resulting pressure rise having had occurred in the preceding stage.

A further important object of the present invention is to provide an improved ignition system for liquid propellant rocket engines in which the possibility of accumulating hazardous quantities of unignited liquid propellants will be materially reduced due to the low initial liquid propellant flow rates, and in which the heating effect from the combustion products of the preceding stage will also reduce the ignition time.

Another important object of the present invention is to provide a three stage ignition system of the type described in which no electrical or mechanical pressure sensing devices and related systems are required to sequence the liquid propellant flow for each ignition stage.

Other objects and advantages of the invention will become apparent during the course of the following description.

Figure 2:
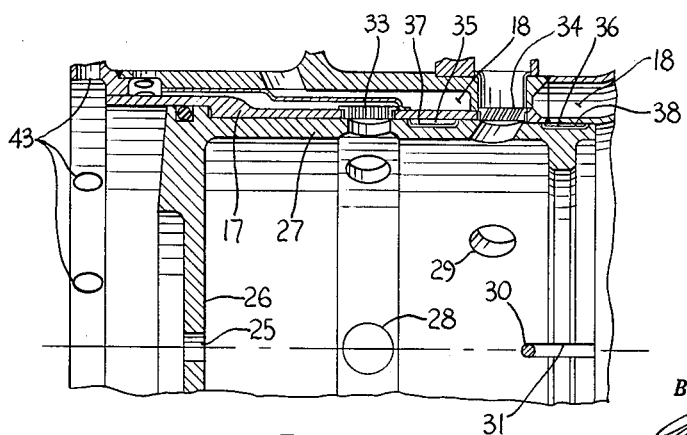

In the drawings I have shown one embodiment of the invention. In this showing:

FIGURE 1 is a fragmentary central longitudinal sectional view of a liquid propellant rocket engine prior to ignition; and FIGURE 2 is a similar view thereof after ignition showing the movement of the shear cup slide and the cutting ring bellows and knives to effect staged flow of propellants.

In general, the combination of the mechanisms for controlling and sequencing the three stage injection and ignition of the propellants of a large liquid propellant rocket engine comprises: a gas generator which will be the first stage igniter and will provide a source of high pressure hot gases; a shear slide located in the second stage combustion chamber which will be actuated by the rise in gas generator pressure and by cutting the injection shear cups, will admit liquid propellants to initiate second stage combustion; and the main (third stage) flow initiating mechanisms which will be operated by a rise in chamber pressure and will admit liquid propellants through the impinging stream injector manifolds into the main combustion chamber.

Referring to the drawings, numeral 10 designates the main combustion or thrust chamber of a liquid propellant rocket engine as defined by the wall 13 which terminates at its aft end in a thrust nozzle (not shown). The engine is provided with annular oxidizer and fuel tanks 14 and 15 separated by a baffle 16 which are concentric with the combustion chamber 10.

The main combustion chamber 10 opens onto and is connected with a shear slide injection or second stage combustion chamber 17 by an injection plate comprised of concentric, annular oxidizer and fuel manifolds 18 and 19 respectively provided with a plurality of circumferentially spaced adjacent injection orifices through which injected propellants pass to impinge at points 20 in the main combustion chamber as will be described. A gas generator chamber 23 having a solid propellant 24 mounted therein is arranged centrally of the oxidizer tank 14 and connected to the injection chamber 17 with which it has communication by means of a central orifice 25 in the head 26 of a piston-like shear slide 27 having longitudinally spaced oxidizer and fuel injection orifices 28 and 29 respectively arranged circumferentially therein.

The wall of the injection chamber 17 is provided with similarly spaced and arranged injection oxidizer and fuel injection orifices plates 33 and 34 respectively which retain (and are sealed by) shear cups 35 and 36 in ports in the wall of the chamber 17, the shear cups being seated in recesses 37 and 38 respectively in the outer surface of the shear slide 27. It will be apparent that when the slide moves from the position shown in FIGURE 1 to that of FIGURE 2, that the slide will shear off the cups 35 and 36 and align the slide orifices 28 and 29 with the orifice plates 33 and 34 respectively, movement of the slide being guided by a pin 30 and slide slot 31.

The fuel in the tank 15, when pressurized, passes around the aft end of a baffle 39 and between it and the combustion chamber wall 13 to regeneratively cool the same and the oxidizer tank 14 is provided with a baffle 40 spaced from the gas generator 23. It will be noted that circumferentially spaced ports 43 afford communication between the latter and the pressurizing gas passage 44 so that upon ignition of the first stage solid propellant 24, the resulting pressurizing gases will flow through the ports 43, passage 44 and by way of port 45 into the oxidizer tank 14 to pressurize it. The passage 44 is similarly connected with the fuel tank (not shown).

The propellant tanks are sealed at their outlets by annular seals 46 and 47 closing ports to an annular housing 48 having a central partition 49 defining chambers 50 and 51 which are respectively in communication with the oxidizer and fuel manifolds 18 and 19. Seal cutting rings 54 and 55 are supported in the chambers 50 and 51 by evacuated spring bellows 56 and 57 circumferentially spaced at equal intervals between sets of cutting ring knives 58.

The cutting of the seals 46 and 47 by the knives 58 will initiate third stage or main propellant flow so that hold back pins 59 and 59a are provided in the partition 49 to prevent movement of the cutting rings 54 and 55 during storage.

It will be appreciated that it will be necessary to provide a seal to prevent unburned propellants from entering the third stage injector manifolds 18 and 19 during the firing of the second stage prior to initiation of main propellant flow. This is effected by filling the manifolds 18 and 19 and the chambers 50 and 51 with an inert, non-corrosive, low viscosity liquid compatible with the propellants such as one of the fluorolubes which will be retained in the injector manifolds by sealing the faces thereof at the injection orifices (which impinge at 20) with a low melting point thermoplastic 60.

It will be apparent that during second stage firing, the thermoplastic will melt and allow the chamber pressure to act on the spring bellows 56 and 57 of the cutting rings 54 and 55 through the medium of the incompressible inert liquid. Any unburned propellants which might be carried into the manifolds during this period will be flushed out by the inert liquid as it is driven out of the injection orifices of the manifolds by the incoming propellants.

The operation of the three stage ignition system comprising the present invention is believed to be apparent. The solid propellant 24 is electrically ignited by means of a conventional squib, etc. (not shown) to initiate operation of the gas generator 23 or first stage igniter to provide a source of high pressure and temperature gases.

Some of these gases pressurize the propellant tanks 14 and 15 by way of the ports 43, passage 44, ports 45, etc. and the balance of the gases act against the shear slide head 26 with a portion passing through the orifice 25 into the injection or second stage combustion chamber 17. The rapid rise of generator chamber gas pressure drives the shear slide 27 aft or to the right as seen in FIGURE 2 shearing off the shear cups 35 and 36 and aligning the injection ports 28 and 29 with the oxidizer and fuel injection orifice plates 33 and 34 to admit the pressurized propellants to the chamber 17 when they are ignited by the turbulent hot gases from the gas generator 23.

The rise in pressure and temperature in the main combustion chamber 10 as a result of the second stage combustion in the chamber 17 causes the thermoplastic seal 60 on the third stage injectors of the manifolds 18 and 19 to melt or burn away. As the combustion pressure in chamber 10 rises, the force created by the now pressurized incompressible inert fluid contained in chambers 56 and 57 on both the oxidizer and fuel cutting ring bellows 56 and 57 will rise until it is sufficient to collapse the bellows and to shear the holdback pins 59 and 59a and release the cutting rings 54 and 55.

The points of the cutting ring knives 58 will then be driven by the force of the collapsing bellows through the oxidizer and fuel annular tanks seals 46 and 47 which rupture when cut due to the pressure exerted on them to initiate the main or third stage propellant flow through the chambers 56 and 57 around and past knives 58 and the through manifolds 18 and 19 respectively to their injectors to impinge, as explained, at 20. Knives 58 do not close off the passage closed by seals 46 and 47 since the fully collapsed bellows prevents movement of the knives into the passages to that extent.

The propellants are thus injected into the main combustion chamber 10 when they are ignited by the combustion gases from the secondary combustion chamber 17. Third stage ignition is thus accomplished to initiate full thrust operation of the rocket engine.

It will now be appreciated that the three stage ignition system described operates automatically in a fail safe manner inasmuch as the liquid propellants cannot be injected in one stage without combustion and resulting pressure rise having occurred in the preceding stage, and that the staged sequencing of propellant flow for each ignition stage is accomplished without the use of electrical or mechanical pressure or temperature sensing devices and related systems.

It is to be understood that the form of the invention herewith shown and described is to be taken as a preferred example of the same and that various changes in the shape, size and arrangement of parts may be resorted to without departing from the spirit of the invention or the scope of the subjoined claims.

We claim:

1. A liquid propellant rocket engine having a three stage ignition system comprising in combination, a thrust chamber, an injection chamber connected therewith, a gas generator including a solid propellant therein communicating with said injection chamber, propellant tankage including ports communicating with said thrust and said injection chambers and adapted to be pressurized by said gas generator upon first stage ignition of the solid propellant, means sealing said communicating ports, means responsive to generated gases of said generator upon first stage ignition of said engine therein to shear said sealing means of said injection chamber ports to admit propellants thereto for second stage ignition and combustion therein, and additional means responsive to the pressure of second stage combustion to pierce said sealing means of said thrust chamber ports and admit propellants thereto for third stage ignition and combustion therein.

2. The combination recited in claim 1 wherein said generated gas responsive means comprises a slide conforming with said injection chamber and including supporting recesses for said seals of said injection chamber ports and ports alignable with said chamber ports upon responsive movement of said slide to shear said sealing means.

3. The combination recited in claim 1 wherein said additional means comprises an evacuated bellows, a knife mounted on said bellows in alignment with said sealing means of said combustion chamber ports, and a shear pin preventing movement of said bellows until a predetermined second stage combustion pressure is reached.

4. The combination recited in claim 2 wherein said additional means comprises an evacuated bellows, a knife mounted on said bellows in alignment with said sealing means of said combustion chamber ports, and a shear pin preventing movement of said bellows until a predetermined second stage combustion pressure is reached.

5. The combination recited in claim 3 wherein propellant manifolds connect said thrust chamber and said thrust chamber ports, an inert liquid fills said manifolds, and a low melting point thermoplastic seals said liquid in said manifolds until said predetermined combustion pressure is reached to effect a melting thereof and expose said liquid and said bellows to said pressure, shear said pin, and effect piercing movement of said knife.

6. The combination recited in claim 4 wherein said liquid propellant tankage includes oxidizer and fuel tanks for separately supplying oxidizer and fuel to said manifolds, and adjacent oxidizer and fuel orifices are formed in said manifolds within said thrust chamber to effect the impinging of oxidizer and fuel jets therewithin.

7. The combination recited in claim 5 wherein said liquid propellant tankage includes oxidizer and fuel tanks for separately supplying oxidizer and fuel to said manifolds, and adjacent oxidizer and fuel orifices are formed in said manifolds within said thrust chamber to effect the impinging of oxidizer and fuel jets therewithin.

8. A liquid propellant rocket engine having a three stage ignition system comprising a thrust chamber terminating forwardly in concentric oxidizer and fuel manifolds, adjacent orifices formed in said manifolds to effect impinging jets therefrom within said chamber, an injection chamber including spaced oxidizer and fuel ports connected to and communicating with said thrust chamber, a slide including ports alignable with said injection chamber ports, shear cups sealing said last mentioned ports and supported by said slide and rupturable upon movement thereof to admit second stage oxidizer and fuel to said injection chamber, oxidizer and fuel tanks communicating with said injection chamber ports and with said manifolds, means sealing off said manifolds from said tanks, piercing means responsive to second stage combustion pressure in said injection chamber to pierce said sealing means and admit third stage oxidizer and fuel to said thrust chamber, and a gas generator including a first stage solid propellant connected to and communicating with said injection chamber and with said tanks to pressurize the same with generated gases upon first stage ignition of said solid propellant, said slide being responsive to generated gas pressure to move and admit second stage oxidizer and fuel to said injection chamber, and including an aperture to admit igniting first stage gases thereto to effect second stage combustion, the pressure of said second stage combustion acting through said manifolds to actuate said piercing means and admit oxidizer and fuel to said thrust chamber for ignition by said second stage combustion to initiate third stage combustion in said thrust chamber.

References Cited in the file of this patent

UNITED STATES PATENTS

| | | |
|---|---|---|
| 2,922,291 | Fox et al. | Jan. 26, 1960 |
| 2,992,528 | Ozanich et al. | July 18, 1961 |